Feb. 21, 1967 B. D. LOUGHLIN ET AL 3,305,637

CONTROL APPARATUS FOR A TELEVISION RECEIVER COMPRISING A BACK PORCH KEYED AGC SYSTEM

Filed Oct. 31, 1963 2 Sheets-Sheet 1

Feb. 21, 1967 B. D. LOUGHLIN ET AL 3,305,637
CONTROL APPARATUS FOR A TELEVISION RECEIVER COMPRISING
A BACK PORCH KEYED AGC SYSTEM
Filed Oct. 31, 1963 2 Sheets-Sheet 2

3,305,637

CONTROL APPARATUS FOR A TELEVISION RECEIVER COMPRISING A BACK PORCH KEYED AGC SYSTEM

Bernard D. Loughlin, Centerport, N.Y., and Stephen P. Ronzheimer, Elmhurst, Ill., assignors to Hazeltine Research Inc., a corporation of Illinois Filed Oct. 31, 1963, Ser. No. 320,293
11 Claims. (Cl. 178—7.5)

Figure 1:
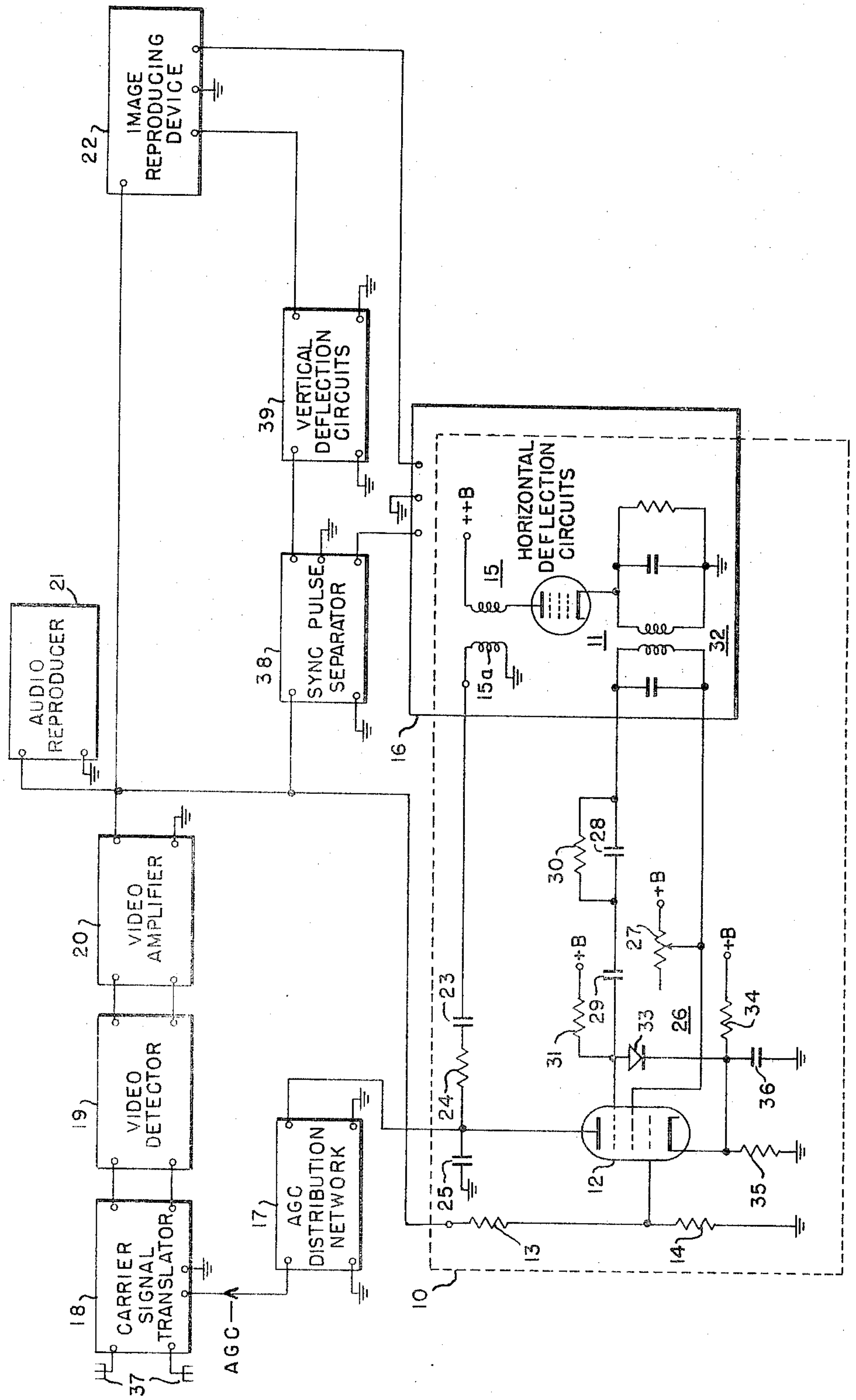

The present invention relates to control apparatus for use in a television receiver. The function of this control apparatus is to derive, from the horizontal back porch blanking level, a signal representative of variations in the amplitude of the blanking level and further to use this signal to stabilize characteristics of the image-reproducing apparatus in the receiver. One such use is to develop an automatic-gain-control (AGC) bias from the derived signal.

Several problems arise when an AGC bias is derived, for example, in a keyed AGC system from the back porch level. The first of these is the problem of assuring that the AGC bias is not derived from synchronizing pulses or noise signals whose peak portions extend into the "blacker than black" region.

One solution offered is the use of back porch keying as described in B. D. Loughlin's copending application, Serial No. 223,493, now abandoned, filed September 13, 1962 and entitled "Control Apparatus for a Television Receiver." A further improvement in back porch keyed AGC systems results from the use of a synchronizing pulse aperture network as described in B. D. Loughlin's copending application, Serial No. 320,392 filed October 31, 1963, and entitled "Control Apparatus for a Television Receiver" filed concurrently herewith.

However, when high average brightness scenes are received by a television receiver utilizing AGC systems of the latter type, it is possible that the synchronizing pulse aperture may respond to the back porch level itself so that the AGC system is "locked out" of operation. In this case no AGC bias is developed so that the signal-translating channel in the television receiver is operated in an overload condition. In this case, the AGC system is permanently "locked out" so that receiver operation can only be restored by such inconvenient expedients as disconnecting the source of 60 cycle line voltage, disconnecting the antenna, or switching from one channel to another and back again.

It is, therefore, an object of the present invention to provide an improved AGC apparatus which derives an AGC bias from the back porch level of a television picture signal.

It is a further object of the present invention to provide a back porch keyed AGC apparatus which includes an improved synchronizing pulse aperture network to assure that an AGC bias is not derived from synchronizing pulses.

It is still another object of the present invention to provide a synchronizing pulse aperture network that does not "aperture" on the back porch level of a television picture signal.

In accordance with the present invention there is provided control apparatus for a television receiver having an image-reproducing apparatus including a television picture signal-translating channel and an image-reproducing device. The control apparatus comprises signal supplying means for supplying at least the horizontal back porch blanking level of a television picture signal. The apparatus also includes first pulse generating means for supplying pulses whose peak portions are substantially in overlapping time relationship with the synchronizing pulses of the television picture signal and second pulse generating means for supplying synchronizing pulse-cancelling pulses and other pulses whose peak portions are in overlapping time relationship with the blanking level. Further included are means, responsive to the supply signals and pulses, including synchronizing pulse aperture means, for deriving a signal representative of variations in the amplitude of the blanking level, the aperture means for preventing the deriving of the signal from the synchronizing pulses and being responsive to the pulses supplied from the second pulse generating means to be inoperative to the reference level and means for utilizing the derived signal to stabilize a characteristic of the image-reproducing apparatus.

For a better understanding of the present invention together with other and further objects thereof, reference is had to the following description taken in connection with the accompanying drawings, and its scope will be pointed out in the appended claims.

Referring to the drawings:

FIG. 1 shows a television receiver which includes one example of control apparatus constructed in accordance with the present invention, and FIGS. 2*a*–2*f* show voltage and current waveforms useful to explain the operation of the control apparatus shown in FIG. 1.

FIG. 1 shows a television receiver and includes control apparatus 10 which comprises one embodiment of the present invention. With the exception of apparatus 10 and 11, which are to be discussed more fully below, representative embodiments of the remaining portions of the receiver can be found in such standard reference publications as "Television Engineering Handbook" by Donald G. Fink.

Figures 2A, 2B, 2C, 2D, 2E, 2F:
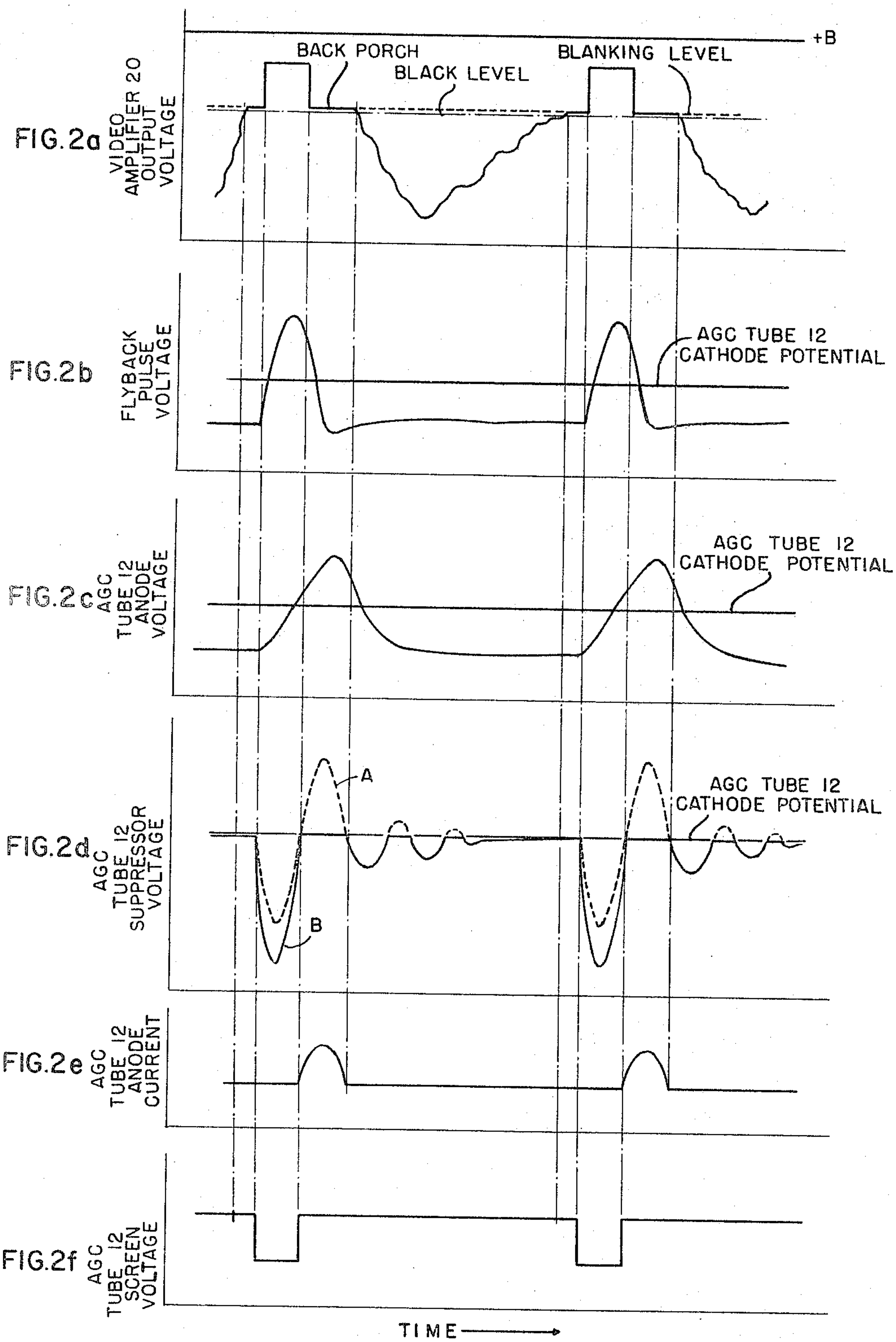

Control apparatus 10 of the present invention comprises means to derive, from the horizontal back porch blanking level, a signal representative of variations in the amplitude of the blanking level. To this end at least the blanking level is supplied to an electron device, such as pentode 12, in a keyed rectifier circuit, through a voltage divider 13, 14. Pentode 12 is operated as a keyed rectifier by the application of pulses whose peak portions are substantially in overlapping time relationship with the synchronizing pulses shown for example in FIG. 2*a*. The former pulses may be flyback pulses, such as those shown in FIG. 2*b*, supplied from a winding 15*a* of the line scan output transformer 15 in the horizontal deflection circuits 16. These pulses render the anode of pentode 12 more positive than the cathode so that pulses of anode current are drawn. A typical anode current waveform is shown in FIG. 2*e*. In a manner to be more fully described below, this current is drawn only during the back porch time interval, is representative of variations of the amplitude of the blanking level and is coupled to an AGC distribution network 17 which integrates the pulses of current to derive an AGC bias voltage which is used to regulate the operation of a carrier signal translator 18 to maintain the television picture signal in the signal-translating apparatus of the receiver, within a desired signal intensity range for a wide range of received picture signal intensities.

To assure that keying of the pentode 12 takes place only during the back porch time interval, the flyback pulses are coupled, for example, through a capacitance 23 to a delay means comprising a resistance 24 and a capacitance 25. The time constant of the delay means is chosen so that the peak portions of the flyback pulses are delayed so as to occur at the anode of pentode 12 during the time occurrence of the blanking interval. This time relationship is shown in FIGS. 2*a*, 2*b* and 2*c*, where FIG. 2*a* represents the output of video amplifier 20 and FIG. 2*c* represents the delayed pulses applied to the anode of pentode 12.

In the control apparatus 10, there is provided a synchronizing pulse aperture means 26 for preventing the control apparatus 10 from deriving a signal from synchronizing pulses or noise peaks extending into the "blacker than black" region. Means 26 includes a screen biasing resistance 27 adjusted to assure that instantaneous variations of pentode 12 screen current are negligible at all times except during the time occurrence of synchronizing pulses or the aforesaid noise peaks at the control grid of pentode 12. During these time intervals however, the instantaneous screen current increases and voltage pulses constituting amplified, inverted synchronizing pulses or noise peaks are developed across the resistance 27. These instantaneous voltage variations, shown in FIG. 2*f*, are coupled through capacitors 28 and 29 to the suppressor grid of pentode 12. Means 26 also includes a suppressor biasing resistance 31 connected to a suitable source of D.-C. potential to provide a convenient quiescent level at the suppressor grid so that the instantaneous screen grid voltage variations coupled to the suppressor grid are sufficient to prevent any anode current conduction during the synchronizing pulse time intervals.

In accordance with the present invention, there is provided means for preventing the aperture 26 from operating on the blanking level itself during scenes of high average brightness. To this end, a pulse generating means comprising a tuned circuit 32, tuned to a frequency greater than the line scan frequency, comprising resistance, inductance and capacitance is connected to the cathode of a horizontal output amplifier 11 and is coupled to the aperture means 26. Groups of damped sinusoidal oscillations, shown as waveform A in FIG. 2*d*, are derived from the circuit 32 when the amplifier 11 is cut off at the end of each line scanning interval effectively shock-exciting the tuned circuit 32. Circuits useful for deriving pulses in this manner are described in applicants' copending application Serial No. 224,276, now Patent Number 3,249,695, filed September 13, 1962 and entitled "Control Apparatus for a Television Receiver."

The first negative-going half-cycle of each group of oscillations acts effectively as a synchronizing pulse-cancelling pulse and the next succeeding positive half-cycle is a pulse having its peak portion in overlapping time relationship with the blanking level. These pulses are coupled through parameters 28, 29 and 30 to the suppressor grid of pentode 12. Another electron device, for example a diode 33, clamps the positive-going portions of these pulses to the potential at the cathode of pentode 12. The total instantaneous suppressor voltage is shown as waveform B in FIG. 2*d* and is the sum of the clamped voltage pulses, A, and the screen voltage variations coupled to the suppressor grid. The combined aperture and tuned circuit waveform at the suppressor grid, as shown by waveform B in FIG. 2*d*, provides a very negative voltage with respect to the cathode during the synchronizing pulse interval, thereby preventing improper "setup" of AGC on synchronizing pulses. Diode 33 clips the positive-going second half-cycle of the keying waveform at cathode potential, thereby preventing variations of AGC voltage which may otherwise occur because of fluctuations of suppressor grid-to-cathode potential. Aperturing on the blanking portion of the signal is prevented by the first positive-going half-cycle of the waveform A. Should any transient conditions occur which would tend to cause the circuit to aperture on blanking pedestal, this positive-going portion of the waveform carries the suppressor grid potential sufficiently close to cathode potential to permit plate current to flow, thereby restoring AGC voltage and normal operation. Aperture means 26 also prevents improper "setup" of AGC on noise.

To conclude consideration of apparatus 10, there is also shown a cathode-biasing network connected to the pentode 12, comprising, for example, parameters 34, 35 and 36 which are coupled to a suitable source of D.-C. potential. This network is provided to fix the threshold level of receiver input at which an AGC bias is developed by pentode 12.

While applicants do not wish to be limited to any particular set of circuit parameters, the following have proved useful in the control apparatus 10 of FIG. 1:

| | |
|---|---|
| Resistance **13**, K ohms | 68 |
| Resistance **14**, K ohms | 68 |
| Resistance **24**, K ohms | 47 |
| Resistance **27**, K ohms | 15 |
| Resistance **30**, K ohms | 100 |
| Resistance **31**, megohms | 3.3 |
| Resistance **34**, K ohms | 15 |
| Resistance **35**, K ohms | 15 |
| Capacitance **23**, micromicrofarads | 180 |
| Capacitance **25**, micromicrofarads | 100 |
| Capacitance **28**, micromicrofarads | 27 |
| Capacitance **29**, microfarad | 0.0033 |
| Capacitance **36**, microfarads | 5 |
| Electron device **12**, pentode section | 6AK8 |
| Electron device **33** | 1N628, 1N463 |

Brief consideration is now given to the construction and operation of television receivers in which control apparatus of the present invention is used. Although the receiver shown in FIG. 1 is a monochrome receiver, the benefits to be derived from control apparatus of this invention can be obtained in color-television receivers as well.

With reference to FIG. 1 there is shown image-reproducing apparatus which includes a signal-translating channel and an image-reproducing device 22 which may be, for example, a cathode-ray tube. A television signal is intercepted by an antenna system 37 and is coupled to a signal-translating channel which comprises a carrier signal translator 18, a video detector 19 and a video amplifier 20.

The intercepted television signal is amplified and converted to an intermediate carrier frequency by the translator 18. An AGC bias coupled from network 17 maintains the frequency converted television picture signal in the signal-translating channel within a desired signal intensity range for a wide range of received television signal intensities. Moreover, the amplitude variation-representative signal derived by control apparatus 10 can be used to stabilize the blanking level at a level corresponding to that which is required for correct black level operation at the image-reproducing device. Circuits useful to effect this result are shown in the aforesaid copending application, Serial No. 223,493.

The amplified detector output is coupled to a sync pulse separator 38 which in turn supplies the separated synchronizing pulses to horizontal and vertical deflection circuits 16 and 39, respectively. Deflection circuits 16 and 39 derive conventional line and field scanning signals used to develop a raster in the image device 22.

An audio reproducer 21 removes the audio signal present at the amplifier 20 output and reproduces the audio information portion of the received television program. The video signal coupled from amplifier 20 to the image device 22 is used to reproduce a television picture.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a television receiver having an image-reproducing apparatus including a television picture signal-translating channel and an image-reproducing device, control apparatus comprising:

signal supplying means for supplying at least the horizontal back porch blanking level of a television picture signal;

first pulse generating means for supplying pulses whose peak portions are substantially in overlapping time relationship with the synchronizing pulses of said television picture signal;

second pulse generating means for supplying synchronizing pulse-cancelling pulses and other pulses whose peak portions are in overlapping time relationship with said blanking level;

means, responsive to said supply signals and pulses, including synchronizing pulse aperture means, for deriving a signal representative of variations in the amplitude of said blanking level, said aperture means for preventing the deriving of said signal from said synchronizing pulses, said aperture means responsive to said pulses supplied from said second pulse generating means to be inoperative to said blanking level;

and means for utilizing said derived signal to stabilize a characteristic of said image-reproducing apparatus.

2. Control apparatus in accordance with claim 1 in which said blanking level is a level of signal intensity at which said image-reproducing device reproduces black.

3. Control apparatus constructed in accordance with claim 1 in which said image-reproducing device is a cathode-ray tube.

4. Control apparatus constructed in accordance with claim 1 in which said derived signal is used for stabilizing said blanking level at a level corresponding to that which is required for correct black level operation at said image-reproducing device.

5. Control apparatus constructed in accordance with claim 1 in which said derived signal is used to maintain the television picture signal in said signal-translating channel within a desired signal intensity range for a wide range of received signal intensities.

6. Control apparatus constructed in accordance with claim 1 in which said signal and pulse responsive means comprises a keyed rectifier circuit having an electron device direct-current coupled to said signal supplying means.

7. Control apparatus in accordance with claim 6 in which said electron device is a pentode type vacuum tube, the control grid, anode and suppressor electrode of which are direct-current coupled to said signal supplying means, coupled to said supply of first pulses and coupled to said supply of second pulses, respectively.

8. Control apparatus constructed in accordance with claim 7 in which said first pulse generating means comprises horizontal deflection signal generating means for supplying flyback pulses having peak portions occurring substantially in overlapping time relationship with said synchronizing pulses, said flyback pulses coupled to said anode through means for delaying the peak portions thereof so that said peak portions are in overlapping time relationship with said reference level.

9. Control apparatus constructed in accordance with claim 7 in which said synchronizing pulse aperture means comprises an electron device coupling said pentode vacuum tube's suppressor electrode to its cathode, said device for clamping the potential level at said suppressor to the level at said cathode to assure that said tube conducts anode current only during the time occurrence of said blanking level.

10. Control apparatus constructed in accordance with claim 7 in which said synchronizing pulse aperture means comprises an electron device coupling said pentode vacuum tube's suppressor electrode to its cathode for assuring that said tube conducts anode current only during the time occurrence of said blanking level by clamping the potential level at said suppressor electrode to the level at said cathode, said device effectively for preventing undesired variations in said derived signal, said variations produced by said tube's suppressor-to-cathode potential variations during the time occurrence of said blanking level.

11. Control apparatus constructed in accordance with claim 8 in which said horizontal deflection signal generating means comprises a second pulse generating means comprising a shock-excited tuned network for generating groups of damped sinusoidal oscillations, said network tuned to a frequency greater than the horizontal line scan frequency of said television picture signal, each of said groups decaying to zero in less than the period of said line scan frequency; and in which the first negative-going half-cycle of each group of damped oscillations constitutes said synchronizing pulse-cancelling pulses and in which the positive half-cycle succeeding said negative half-cycle constitutes said other pulses whose peak portions are in overlapping time relationship with said blanking level.

References Cited by the Examiner

UNITED STATES PATENTS 3,249,695 5/1966 Loughlin et at. --------178—7.5

FOREIGN PATENTS 649,141 1/1951 Great Britain.

DAVID G. REDINBAUGH, *Primary Examiner.*

R. L. RICHARDSON, *Assistant Examiner.*